United States Patent [19]

Nakamura et al.

[11] Patent Number: 4,533,602
[45] Date of Patent: Aug. 6, 1985

[54] MODIFIED POLYOLEFIN COMPOSITION USEFUL FOR BONDING MATERIALS

[75] Inventors: Yoichi Nakamura, Urawa; Shumei Watarai; Shohta Matsuo, both of Tokyo, all of Japan

[73] Assignee: Ube Industries, Ltd., Yamaguchi, Japan

[21] Appl. No.: 590,848

[22] Filed: Mar. 19, 1984

[30] Foreign Application Priority Data

Mar. 29, 1983 [JP] Japan ................... 58-51582

[51] Int. Cl.$^3$ ............ C08K 3/26; B32B 9/04
[52] U.S. Cl. ..................... 428/447; 524/427; 524/504; 524/505; 428/448; 428/450; 428/452; 428/461
[58] Field of Search ........ 524/427, 504, 505; 525/72; 428/447, 448, 450, 452

[56] References Cited

U.S. PATENT DOCUMENTS 4,153,587 5/1979 Yui ........................ 523/505
4,387,188 6/1983 Statz ....................... 525/72

FOREIGN PATENT DOCUMENTS 54-56641   5/1979  Japan ................... 524/504
54-68852   6/1979  Japan ................... 524/504
55-104338  8/1980  Japan ................... 525/72
56-149452 11/1981  Japan ................... 524/504
57-174327 10/1982  Japan ................... 524/504
58-83043   5/1983  Japan ................... 524/504

*Primary Examiner*—Lewis T. Jacobs
*Attorney, Agent, or Firm*—Burgess, Ryan & Wayne

[57] ABSTRACT

A modified polyolefin composition having an excellent bonding property comprising (A) 10% to 80% by weight of a modified polyolefin resin prepared by modifying a non-modified polyolefin resin such as a polypropylene or ethylene-propylene copolymer with an organic unsaturated compound having a polar radical in the presence of an organic peroxide compound at an elevated temperature; (B) 5% to 50% by weight of a finely pulverized inorganic material such as calcium carbonate or talc; and (C) 10% to 80% by weight of a non-modified polyolefin resin.

14 Claims, No Drawings ial for various materials. More particularly, the present invention relates to a modified polyolefin composition comprising a modified polyolefin resin, finely pulverized inorganic material, and a non-modified polyolefin resin and effective for bonding metallic materials.

MODIFIED POLYOLEFIN COMPOSITION USEFUL FOR BONDING MATERIALS

BACKGROUND OF THE INVENTION

1. Field of the Invention

The present invention relates to a modified polyolefin composition having an excellent bonding property for various materials. More particularly, the present invention relates to a modified polyolefin composition comprising a modified polyolefin resin, finely pulverized inorganic material, and a non-modified polyolefin resin and effective for bonding metallic materials.

2. Description of the Prior Art

Polyolefin resins have excellent chemical and electric properties and, therefore, are useful in various industrial fields. it is well known, however, that regular polyolefin resins are useless as bonding materials for other materials due to the fact that the polyolefin molecules are non-polar.

Various attempts have been made to impart an enhanced bonding activity to polyolefin resins. For example, it has been attempted to modify a polyolefin resin with a modifying agent consisting of at least one member selected from γ-methacryloyloxypropyltrimethoxysilane and glycidylmethacrylate in the presence of a modifying assistant consisting of at least one organic peroxide compound.

However, the improved bonding activity of the resultant modified polyolefin resin was still unsatisfactory. Particularly, in the case where the modified polyolefin resin was used as a bonding material for metallic plates, for example, chromium-plated steel plates or stainless steel plates, it was necessary to degrease the surfaces of the metallic plates with an aqueous solution of an alkali or acid. Even when the degreasing treatment was applied to the metallic plates, the bonding strength of the resultant laminate of metallic plates was less than satisfactory.

Under the above-mentioned circumstances, it is desired by the bonding material industry to enhance the bonding property of a modified polyolefin resin up to a satisfactory level.

SUMMARY OF THE INVENTION

An object of the present invention is to provide a modified polyolefin composition which exhibits a satisfactory bonding property to various materials, for example, metallic plates, plastic sheets or films, fibers, paper, and wooden materials.

Another object of the present invention is to provide a modified polyolefin composition usable as a coating material for various materials, for example, metallic plates, pipes, wires, and cables.

The above-mentioned object of the present invention can be attained by a modified polyolefin composition comprising:

(A) 10% to 80% by weight of a modified polyolefin resin which has been prepared by modifying a non-modified polyolefin resin with a modifying agent consisting of at least one unsaturated organic compound having a polar radical in the presence of a modifying assistant consisting of at least one organic peroxide compound at an elevated temperature;

(B) 5% to 50% by weight of a finely pulverized inorganic material; and (C) 10% to 80% by weight of a non-modified polyolefin resin.

DESCRIPTION OF THE PREFERRED EMBODIMENTS

The modified polyolefin composition of the present invention comprises a modified polyolefin resin (A), a finely pulverized inorganic material (B), and a non-modified polyolefin resin (C).

The modified polyolefin resin (A) is prepared by modifying a non-modified polyolefin resin with a modifying agent consisting of at least one organic unsaturated compound having a polar radical in the presence of a modifying assistant consisting of at least one organic peroxide compound at an elevated temperature.

The non-modified polyolefin resin to be modified may comprise one or more members selected from crystalline polypropylene homopolymers; crystalline random and block copolymers of about 30% by weight or less of at least one member selected from ethylene and α-olefins having 4 to 10 carbon atoms, for example, butene, pentene, hexene, and heptene, with the balance of propylene; polyethylene homopolymers having a density of 0.93 g/cm$^3$ or more; and random and block copolymers of about 15% by weight or less of at least one member selected from α-olefins, for example, propylene, butene, pentene, hexene, and heptene, with the balance of ethylene. The preferable non-modified polyolefin resin to be modified may be selected from polypropylene homopolymers; random and block copolymers of 2% to 15% by weight of ethylene with the balance of propylene; and mixtures of 50% by weight or less, more preferably 25% or less, of polyethylene having a density of at least 0.93 g/cm$^3$, with the balance of at least one copolymer mentioned above.

Also, it is preferable that the non-modified polyolefin resin to be modified have a melt flow rate of from 0.01 to 20 g/10 min, more preferably from 0.5 to 10 g/10 min. The non-modified polyolefin resin can contain a conventional additive, for example, antioxidant.

The organic unsaturated compound usable for the modifying agent is preferably selected from organic silane compounds, for example, vinyltriethoxysilane, methacryloyloxytrimethoxysilane, γ-methacryloyloxypropyltrimethoxysilane, methacryloyloxycyclohexyltrimethoxysilane, γ-methacryloyloxypropyltriacetyloxysilane, methacryloyloxytriethoxysilane and γ-methacryloyloxypropyltriethoxysilane; allylglycidyether compounds, for example, allylglycidylether and 2-methylallylglycidylether; acrylic and methacrylic salts, for example, sodium acrylate, sodium methacrylate, calcium acrylate, calcium methacrylate, magnesium acrylate, magnesium methacrylate, zinc acrylate, zinc methacrylate, aluminum acrylate, aluminum methacrylate, iron (III) acrylate, and iron (III) methacrylate; allylcyanurate compounds, for example, triallylcyanurate, and tri(2-methylallyl)cyanurate; acryloyltriazine compounds, for example, 1,3,5-triacryloylhexahydro-s-triazine, and 1,3,5-trimethacryloylhexahydro-s-triazine; and acryloyloxybenzene compounds, for example, 4-acryloyloxyphenol, 4-(acryloyloxymethyl)phenol, 4-acryloyloxybenzyl alcohol, 4-methacryloyloxyphenol, 4-methacryloyloxybenzyl alcohol, and 4-(methacryloyloxymethyl)benzyl alcohol.

The preferred unsaturated compounds for the present invention are the organic silane compounds. The modifying agent may be one or more organic unsaturated compounds mentioned above.

The modifying assistant usable for the present invention preferably comprises at least one organic peroxide compound which exhibits a one-minute half-life-period temperature of from 160° C. to 260° C. This organic peroxide compound can be selected from tert-butyl-peroxyisopropyl carbonate, di-tert-butyldiperoxyphthalate, tert-butylperoxy acetate, 2,5-dimethyl-2,5-di(tert-butyl-peroxy)hexane, 2,5-dimethyl-2,5-di(tert-butyl peroxy)hexine-3, tert-butylperoxylaurate, tert-butyl-peroxymaleic acid, tert-butylperoxy benzoate, methyl-ethylketone peroxide, dicumylperoxide, cyclohexaneperoxide, tert-butylcumylperoxide, and 2,5-dimethylhexane-2,5-dihydroperoxide.

The modifying assistant may consist of either a single organic peroxide compound or a mixture of two or more organic peroxide compounds.

In the preparation of the modified polyolefin resin (A), the modifying agent is used preferably in an amount of from 0.01 to 5 parts by weight, more preferably, from 0.1 to 3 parts by weight, per 100 parts by weight of the non-modified polyolefin resin to be modified.

Also, the modifying assistant is used preferably in an amount of from 0.01 to 5 parts by weight, more preferably from 0.1 to 2 parts by weight, per 100 parts by weight of the non-modified polyolefin resin to be modified. Also, the modifying assistant is used preferably in an amount of from 5 to 80 parts by weight per 100 parts by weight of the modifying agent.

In the preparation of the modified polyolefin resin (A), the non-modified polyolefin resin is mixed with the modifying agent and the modifying assistant by a conventional mixing method under appropriate conditions under which the modifying assistant is not decomposed and is not deactivated.

The mixture is heated at an appropriate temperature which is higher than the melting point of and lower than the decomposition point of the non-modified polyolefin resin to be modified to cause the non-modified polyolefin resin to react with the modifying agent in the presence of the modifying assistant. Usually, the mixture is heated at a temperature of from about 180° C. to 260° C., preferably from 220° C. to 250° C. The simplest heat-reaction procedure is to feed the mixture into an extruder, heat-melt it at the above-mentioned temperature for 2 to 5 minutes, and then extrude the melt from the extruder.

The resultant modified polyolefin resin preferably exhibits a melt flow rate of from 1 to 150 g/10 min, more preferably from 10 to 50 g/min. The extruded modified polyolefin resin is molded into pellets.

The finely pulverized inorganic material (B) usable for the present invention is preferably selected from heavy calcium carbonate, light calcium carbonate, and talc. Also, it is preferable that the inorganic material be in the form of fine particles having an average size of from 0.05 to 10 microns, more preferably from 0.5 to 5 microns, and a specific surface area of from 0.1 to 100 $m^2/g$, more preferably from 1 to 30 $m^2/g$. Furthermore, it is preferable that the fine particles of the inorganic material not be surface-treated.

The non-modified polyolefin resin (C) usable for the present invention can be selected from those usable as the non-modified polyolefin resin to be modified. Usually, it is preferable that the non-modified polyolefin resin (C) be of the same type as the non-modified polyolefin resin which has been modified.

Also, the non-modified polyolefin resin (C) preferably has a melt flow rate of from 0.1 to 10 g/10 min, more preferably, from 0.3 to 5 g/10 min. The most preferable non-modified polyolefin resin (C) comprises at least one member selected from the group consisting of crystalline polypropylene homopolymers; crystalline random and block copolymers of 30% by weight or less of at least one member selected from the group consisting of ethylene and α-olefins having 4 to 10 carbon atoms, with the balance of propylene; polyethylene having a density of 0.93 $g/cm^3$ or more; random and block copolymers of 2% to 15% by weight of ethylene and the balance of propylene; and mixtures of 50% by weight or less of polyethylene having a density of 0.93 $g/cm^3$ or more with at least one copolymer mentioned above. The non-modified polyolefin resin (C) may contain conventional additives, for example, antioxidants and ultraviolet ray absorbers.

The inorganic material (B) and/or the modified polyolefin resin (A) may be blended in a large content with the non-modified polyolefin resin (C) to provide master batch pellets. The modified polyolefin composition of the present invention is prepared by mixing from 10% to 80% by weight, preferably from 10% to 70% by weight, of a modified polyolefin resin (A) with from 5% to 50% by weight, preferably from 8% to 50% by weight, of a finely pulverized inorganic material (B) and from 10% to 80% by weight, preferably from 10% to 65% by weight, of a non-modified polyolefin resin (C).

If the amounts of the above-mentioned components (A), (B), and (C) fall outside of the above-mentioned ranges, the resultant polyolefin composition exhibits an unsatisfactory bonding property to various materials.

In the preparation of the modified polyolefin composition, certain amounts of additives, for example, weathering stabilizers, heat stabilizers, molding assistants, pigments, for example, carbon black, antistatic agents, flame retardants, electrically conductive materials, for example, metal fibers and pulverized metal particles, rubber materials, for example, an ethylenepropylene copolymer rubber, and thermoplastic resins, for example, polyamides, may be added to the mixture of the above-mentioned components (A), (B), and (C).

The mixing is carried out, for instance, by feeding a modified polyolefin resin (A), an inorganic material (B), and a non-modified polyolefin resin (C) into an extruder, melt-mixing the fed component (A), (B), and (C) at a temperature of from about 180° C. to 260° C., preferably from 220° C. to 250° C., for 1 to 10 minutes, and then extruding the melt to provide a desired shape of a modified polyolefin composition. The extruder is a monoaxial extruder, biaxial extruder, or an FCM type continuous mixer. In the extruding procedure, it is preferable that a venting operation be applied to the melt in the extruder. This venting operation is effective to eliminate moisture which has adhered to the surface of the inorganic material particles and to enhance the bonding property of the resultant modified polyolefin composition.

The modified polyolefin composition of the present invention exhibits an excellent bonding property to various materials. Especially, the modified polyolefin composition exhibits an excellent bonding property not only to degreased metallic articles, but also to non-degreased metallic articles, for example, non-degreased chromium-plated steel articles or non-degreased stainless steel articles.

Therefore, the modified polyolefin composition of the present invention can be used as a principal component of a bonding material for various materials, for instance, various metallic materials.

A bonding material comprising as a principal component the modified polyolefin composition of the present invention can be used for providing a metal laminate wherein two or more metallic layers are bonded. The metallic layer may consist of iron, aluminum, copper, zinc, nickel, tin, stainless steel, brass, tin-plated steel, or zinc-plated steel plate or pipe. The plate or pipe may be or may not be degreased before the bonding operation.

The bonding material may be in the form of a sheet, a film, a pellets, or powder.

In order to produce the metal laminate, the bonding material comprising the modified polyolefin composition of the present invention is placed on both or one of the metal article surfaces to be bonded, the metal articles are superimposed through the layer of the bonding material to provide a precursory laminate, and the precursory laminate is heat-pressed at a temperature of from 170° C. to 260° C., preferably from 180° C. to 230° C.

In another method, the bonding material is melted in an extruder, the melt is extruded through a die onto both or one of the metal article surfaces to be bonded, and the metal articles are superimposed through the layer of the bonding material melt and the resultant precursory laminate is pressed so as to firmly bond the metal articles to each other.

In still another method, the bonding material is coated in the form of powder on both or one of the metal article surfaces to be bonded by means of a powder coating method, and the metal articles are firmly bonded in the same manner as mentioned above.

The surfaces of the metal articles to be bonded may be prime-coated with an epoxy resin primer.

In the production of the metal laminate, it is preferable that two metal plates each having a thickness of from 0.05 to 5.0 mm be bonded to each other through a bonding material layer at a thickness ratio of the bonding material layer to the metal layer of 0.05 to 50 and that the resultant laminate have a thickness of from 0.1 to 20 mm. The laminate may be additionally laminated with another article, for example, a resinous sheet or film, fiber material, paper, or wood.

The modified polyolefin composition of the present invention is useful as a coating material for various article surfaces, for example, outer and inner surfaces of metal pipes, metal plate surfaces, and peripheral surfaces of steel wires, electric wires, and cables.

The following specific examples are presented for the purpose of clarifying the features and advantages of the present invention. However, it should be understood that these examples are intended only to illustrate the present invention and do not limit the scope of the present invention in any way.

In the examples, the melt flow rate of polymer was determined in accordance with ASTM D 1238. Also, the T-peeling strength of the laminate was determined in accordance with Japan Industrial Standard (JIS) K 6854, at a peeling rate of 20 cm/min by using a specimen having a width of 25 mm.

EXAMPLES 1 TO 4

In each of Examples 1 to 4, a Henschel mixer was charged with 100 parts by weight of a non-modified, finely pulverized ethylene-propylene block copolymer having a content of copolymerized ethylene of 8% by weight, a melt flow rate of 1.0 g/10 min, and a melting point of about 160° C.; an antioxidant consisting of 0.1 part by weight of tetrakis-[methylene 3-(3',5'-di-tert-butyl-4'-hydroxyphenyl)propionate]methane (available under the trademark of Irganox 1010 made by Ciba-Geigy Co.), 0.2 part by weight of distearyl thiodipropionate (available under the trademark of Antiox S made by Nippon Oil and Fat Co.), and 0.05 part by weight of calcium stearate; 0.5 part by weight of a modifying agent consisting of γ-methacryloyloxypropyltrimethoxysilane; and 0.25 part by weight of a modifying assistant consisting of tert-butylperoxybenzoate. The charges were mixed for 10 minutes in the mixer. The resultant mixture was fed into a monoaxial extruder having a cylinder thickness of 50 mm and melted at a temperature of 240° C. for a residing time of 2 minutes. The resultant modified ethylene-propylene copolymer was extruded to form pellets having a diameter of 2 mm and a length of 3 mm. The resultant modified ethylene-propylene block copolymer exhibited a melt flow rate of 22 g/10 min.

The above-mentioned modified polyolefin resin (A) was mixed with an inorganic material (B) consisting of calcium carbonate particles having an average size of 1.25 microns and a specific surface area of 1.85 m²/g and a non-modified polyolefin resin (C) consisting of an ethylene-propylene block copolymer pellets which were of the same type as that used for producing the above-mentioned modified copolymer (A), in the amounts indicated in Table 1 by using a blender. The non-modified copolymer pellets contained a usual amount of calcium stearate as an antioxidant.

The mixture was fed into a vent-type monoaxial extruder having a cylinder thickness of 50 mm and melt-kneaded at a temperature of 250° C. for 2 minutes. Then, the melt was extruded from the extruder to provide modified polyolefin composition pellets having a diameter of 2 mm and a length of 3 mm.

The resultant pellets were used as a bonding material to bond two non-degreased chromium-plated steel plates having a thickness of 0.2 mm, a length of 300 mm, and a width of 300 mm to each other. The bonding material was placed between the two steel plates, which were spaced from each other by means of spacers, and preheated at a temperature of from 180° C. to 220° C. for 5 minutes. Then, after the spacers were removed, the resultant precursory laminate was heat-pressed at the above-mentioned temperature under a surface pressure of 3 kg/cm² or more for 3 minutes and cooled down to 50° C. for 25 minutes to provide a three-layer laminate having an overall thickness of 0.8 mm.

The T-peeling strength of the laminate is indicated in Table 1.

EXAMPLES 5 TO 10

In each of Examples 5 to 10, the same procedures as those described in Example 1 were carried out, except that the inorganic material (B) consisted of calcium carbonate particles having an average size of 2.2 microns and a specific surface area of 1.05 m²/g; and the non-modified polyolefin resin (C) consisted of an ethylene-propylene block copolymer having a melt flow rate of 0.35 g/10 min, a content of copolymerized ethylene of 6% by weight, and a melting point of 158° C.; and the components (A), (B), and (C) were mixed in the amount indicated in Table 1.

The resultant laminate exhibited the T-peeling strength indicated in Table 1.

EXAMPLES 11 TO 13

In each of Examples 11 to 13, the same procedures as those described in Example 1 were carried out, except that the inorganic material (B) consisted of calcium carbonate particles having an average particle size of 1.0 micron and a specific surface area of 25 m²/g, and the components (A), (B), and (C) were mixed in the amounts indicated in Table 1.

The T-peeling strength of the resultant laminate was excellent, as indicated in Table 1.

lymerized ethylene of 6% by weight, and a melting point of 158° C.
Type C of failure—Cohesive failure

EXAMPLES 14 TO 25

In each of Examples 14 to 25, the same procedures as those described in Example 1 were carried out, except that the modified polyolefin resin (A), the inorganic material (B), and the non-modified polyolefin resin (C) were mixed to each other in the amount indicated in Table 2 and the resultant modified polyolefin composition was used to bond two non-degreased stainless steel plates, SUS 304 or SUS 430, having a thickness of 0.15

TABLE 1

| | Modified polyolefin composition | | | | | | T-Peeling strength | |
|---|---|---|---|---|---|---|---|---|
| | Modified polyolefin | Inorganic material (B) | | Non-modified polyolefin resin (C) | | | T-peeling | |
| Example No. | resin (wt %) | Type | Amount (wt %) | Type | Amount (wt %) | Type of metal plates | strength (kg/cm) | Type of failure |
| 1 | 20 | (a) | 25 | (1) | 55 | Non-degreased, | 14.7 | C |
| 2 | 40 | " | 20 | " | 40 | chromium-plated | 15.0 | " |
| 3 | 70 | " | 10 | " | 20 | steel plate | 13.8 | " |
| 4 | 10 | " | 30 | " | 60 | | 14.5 | " |
| 5 | 15 | (b) | 15 | (2) | 70 | | 15.5 | " |
| 6 | 40 | " | 40 | " | 20 | | 14.3 | " |
| 7 | 30 | " | 50 | " | 20 | | 13.7 | " |
| 8 | 50 | " | 10 | " | 40 | | 14.0 | " |
| 9 | 60 | " | 30 | " | 10 | | 15.5 | " |
| 10 | 10 | " | 50 | " | 40 | | 12.8 | " |
| 11 | 10 | (c) | 40 | (1) | 50 | | 13.9 | " |
| 12 | 40 | " | 50 | " | 10 | | 14.0 | " |
| 13 | 10 | " | 10 | " | 80 | | 13.5 | " |

Note:
(a)—Calcium carbonate particles having an average size of 1.25 microns and a specific surface area of 1.85 m²/g
(b)—Calcium carbonate particles having an average size of 2.2 microns and a specific surface area of 1.05 m²/g
(c)—Calcium carbonate particles having an average size of 1.0 microns and a specific surface area of 24 m²/g
(1)—Ethylene-propylene block copolymer having a melt flow rate of 1.0 g/10 min, a content of copolymerized ethylene of 8% by weight, and a melting point of 160° C.
(2)—Ethylene-propylene block copolymer having a melt flow rate of 0.35 g/10 min, a content of copomm, a length of 300 mm, and a width of 300 mm.
The resultant laminate exhibited an excellent T-peeling strength, as indicated in Table 2.

TABLE 2

| | Modified polyolefin composition | | | | | | T-Peeling strength | |
|---|---|---|---|---|---|---|---|---|
| | Modified polyolefin | Inorganic material (B) | | Non-modified polyolefin resin (C) | | | T-peeling | |
| Example No. | resin (wt %) | Type | Amount (wt %) | Type | Amount (wt %) | Type of metal plates | strength (kg/cm) | Type of failure |
| 14 | 70 | (a) | 10 | (1) | 20 | SUS 304 | 11.5 | C |
| 15 | 50 | " | 15 | " | 35 | " | 12.8 | " |
| 16 | 30 | " | 30 | " | 40 | " | 13.9 | " |
| 17 | 40 | " | 50 | " | 10 | " | 12.5 | " |
| 18 | 50 | " | 10 | " | 40 | " | 12.3 | " |
| 19 | 10 | " | 30 | " | 60 | " | 12.5 | " |
| 20 | 70 | " | 10 | " | 20 | SUS 430 | 12.5 | " |
| 21 | 50 | " | 15 | " | 35 | " | 13.4 | " |
| 22 | 30 | " | 30 | " | 40 | " | 14.3 | " |
| 23 | 40 | " | 50 | " | 10 | " | 13.5 | " |
| 24 | 50 | " | 10 | " | 40 | " | 13.1 | " |
| 25 | 10 | " | 30 | " | 60 | " | 13.7 | " |

COMPARATIVE EXAMPLES 1 TO 11

In each of the Comparative Examples 1 to 11, the same procedures as those described in Example 1 were carried out, except that no inorganic material (B) was used, the modified polyolefin resin (A) and the non-modified polyolefin resin (C) were used in the amounts indicated in Table 3, and the resultant comparative modified polyolefin composition was used to bond two non-degreased metal plates of the type indicated in Table 3.

The resultant comparative laminate exhibited an unsatisfactory T-peeling strength, as indicated in Table 3.

TABLE 3

| Comparative Example No. | Modified polyolefin composition ||||  Type of metal plates | T-Peeling strength |||
|---|---|---|---|---|---|---|---|
| | Modified polyolefin resin (wt %) | Inorganic material (B) (wt %) | Non-modified polyolefin resin (C) ||| T-peeling strength (kg/cm) | Type of failure |
| | | | Type | Amount (wt %) | | | |
| 1 | 100 | 0 | (1) | 0 | Chromium-plated steel | 1.5 | S |
| 2 | 60 | 0 | " | 40 | Chromium-plated steel | 1.3 | S |
| 3 | 40 | 0 | " | 60 | Chromium-plated steel | 1.5 | S |
| 4 | 10 | 0 | " | 90 | Chromium-plated steel | 1.1 | S |
| 5 | 80 | 0 | " | 20 | SUS 304 | 0.8 | S |
| 6 | 50 | 0 | " | 50 | " | 1.0 | S |
| 7 | 30 | 0 | " | 70 | " | 0.9 | S |
| 8 | 100 | 0 | " | 0 | SUS 430 | 1.2 | S |
| 9 | 70 | 0 | " | 30 | " | 1.0 | S |
| 10 | 30 | 0 | " | 70 | " | 1.1 | S |
| 11 | 20 | 0 | " | 80 | " | 0.9 | S |

Note: S — Interfacial failure

EXAMPLES 26 TO 32

In each of Examples 26 to 32, the same procedures as those described in Example 1 were carried out, except that the modified polyolefin composition having the composition indicated in Table 4 was prepared by using master batch pellets consisting of 30% by weight of the same type of calcium carbonate as that described in Example 1 and the balance of the same type of non-modified ethylene-propylene block copolymer as that described in Example 1.

Two chromium-plated steel plates having a thickness of 0.2 mm, a length of 150 mm, and a width of 25 mm were degreased by immersing them in an aqueous solution containing 3% by weight of an alkali degreasing agent (available under the trademark of Methasol H-400 made by Marubishi Kako Industrial Co., Ltd, Japan) at a temperature of from 70° C. to 80° C. for 5 minutes, by rinsing with water and then by drying.

The two degreased plates were bonded to each other with the modified polyolefin composition to produce a three-layer laminate having a thickness of 1.0 mm.

The T-peeling strength of the laminate was excellent, as indicated in Table 4.

EXAMPLE 33

The same procedures as those described in Example 1 were carried out, except that 0.5 part by weight of carbon black (available under the trademark of Mitsubishi Carbon No. 600 made by Mitsubishi Chemical Industries, Ltd., Japan) per 100 parts by weight of the modified polyolefin composition were added.

The T-peeling strength of the resultant laminate was 15.2 kg/cm and the type of failure was cohesive failure.

We claim:

1. A modified polyolefin composition having excellent bonding properties comprising:
(A) 10% to 80% by weight of a modified polyolefin resin prepared by modifying a non-modified polyolefin resin consisting essentially of at least one member selected from the group consisting of (a) crystalline polypropylene homopolymers, (b) crystalline random and block propylene copolymers containing not more than 30% by weight of at least one member selected from the group consisting of ethylene, and α-olefins having 4 to 10 carbon atoms, (c) polyethylene homopolymers having a density of at least 0.93 g/cm$^3$, (d) random and block ethylene copolymers containing not more than 15% by weight of an α-olefin, and (e) mixtures

TABLE 4

| Example No. | Modified polyolefin composition ||||| Type of metal plates | T-Peeling strength ||
|---|---|---|---|---|---|---|---|---|
| | Modified polyolefin resin (wt %) | Inorganic material (B) || Non-modified polyolefin resin (C) || | T-peeling strength (kg/cm) | Type of failure |
| | | Type | Amount (wt %) | Type | Amount (wt %) | | | |
| 26 | 70 | (a) | 9 | (1) | 21 | Degreased Cr-plated steel plated | 14.5 | C |
| 27 | 60 | " | 12 | " | 28 | Degreased Cr-plated steel plated | 16.2 | C |
| 28 | 50 | " | 15 | " | 35 | Degreased Cr-plated steel plated | 15.8 | C |
| 29 | 40 | " | 18 | " | 42 | Degreased Cr-plated steel plated | 15.8 | C |
| 30 | 30 | " | 21 | " | 49 | Degreased Cr-plated steel plated | 16.3 | C |
| 31 | 20 | " | 24 | " | 56 | Degreased Cr-plated steel plated | 17.3 | C |
| 32 | 10 | " | 27 | " | 63 | Degreased Cr-plated steel plated | 16.0 | C | of the polymers of (a), (b), (c) and (d) with not more than 50% by weight of the mixture of at least one polyethylene homopolymer having a density of at least 0.93 g/cm³, with a modifying agent in an amount of from 0.01 to 5 parts by weight per 100 parts by weight of said non-modified polyolefin resin, said modifying agent consisting essentially of at least one unsaturated silane compound having a polar radical, in the presence of a modifying assistant consisting essentially of at least one organic peroxide compound at an elevated temperature;

(B) 5% to 50% by weight of a finely pulverized inorganic material consisting essentially of at least one member selected from the group consisting of heavy calcium carbonate and light calcium carbonate each in the form of particles having an average size of from 0.05 to 10 microns; and (C) 10% to 80% by weight of the non-modified polyolefin resin.

2. A modified polyolefin composition as claimed in claim 1, wherein said non-modified polyolefin resin (b) which is modified consists essentially of block copolymers of propylene and 2% to 15% by weight of ethylene.

3. The modified polyolefin composition as claimed in claim 1, wherein said non-modified polyolefin resin has a melt flow rate of from 0.01 to 20 g/10 min.

4. The polyolefin composition as claimed in claim 1, wherein said organic silane compound is selected from vinyltriethoxysilane, methacryloyloxytrimethoxysilane, γ-methacryloyloxypropyltrimethoxysilane, methacryloyloxycyclohexyltrimethoxysilane, γ-methacryloyloxypropyltriacetyloxysilane, methacryloyloxytriethoxysilane and γ-methacryloyloxypropyltriethoxysilane.

5. The modified polyolefin composition as claimed in claim 1, wherein said organic peroxide compound exhibits a one-minute half-life period temperature of from about 160° C. to 260° C.

6. The modified polyolefin composition as claimed in claim 1, wherein the modifying assistant is used in an amount of 0.01 to 5 parts by weight per 100 parts by weight of said non-modified polyolefin resin to be modified.

7. The modified polyolefin composition as claimed in claim 1, wherein the modifying assistant is used in an amount of 5 to 80 parts by weight per 100 parts by weight of the modifying agent.

8. The modified polyolefin composition as claimed in claim 1, wherein said elevated temperature for modification is higher than the melting point of and lower than the decomposition point of the non-modified polyolefin resin to be modified.

9. The modified polyolefin composition as claimed in claim 8, wherein said elevated temperature for modification is in the range of from 180° C. to 260° C.

10. The modified polyolefin composition as claimed in claim 1, wherein said modified polyolefin resin (A) exhibits a melt flow rate of from 1 to 150 g/10 min.

11. The modified polyolefin composition as claimed in claim 1, wherein the fine particles of the finely pulverized inorganic material (B) have a specific surface area of from 0.1 to 100 m²/g.

12. The modified polyolefin composition as claimed in claim 1, wherein said non-modified polyolefin resin (C) comprises at least one member selected from the group consisting of crystalline polypropylene homopolymers; crystalline random and block copolymers of 30% by weight or less of at least one member selected from the group consisting of ethylene and α-olefins having 4 to 10 carbon atoms, with the balance of propylene; polyethylene having a density of 0.93 g/cm³ or more; random and block copolymers of 2% to 15% by weight of ethylene and the balance of propylene; and mixtures of 50% by weight or less of polyethylene having a density of 0.93 g/cm³ or more with at least one copolymer mentioned above.

13. The modified polyolefin composition as claimed in claim 1, wherein said non-modified polyolefin resin (C) exhibits a melt flow rate of from 0.1 to 10 g/10 min.

14. A laminate comprising at least two layers independently selected from the group consisting of metal, plastic and wood bonded to each other with a bonding material comprising a modified polyolefin composition as claimed in claim 1.

* * * * *